Figure 1:
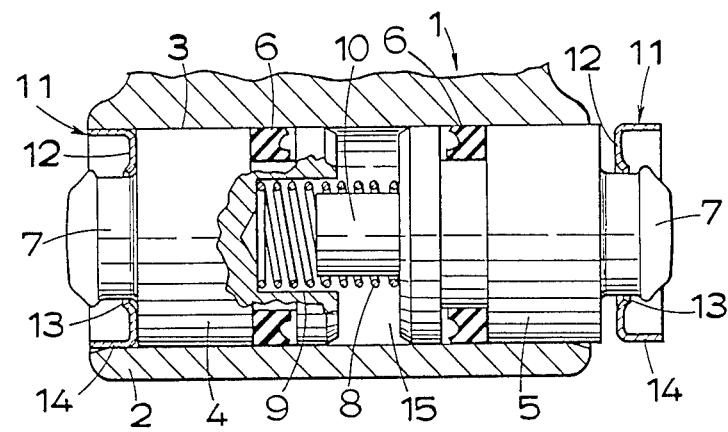

United States Patent [19]

Price et al.

[11] Patent Number: 4,809,588
[45] Date of Patent: Mar. 7, 1989

[54] HYDRAULIC PISTON AND CYLINDER ASSEMBLIES

[75] Inventors: Anthony G. Price, Croseyceiliog, Wales; Roy Campbell, Bromsgrove, England

[73] Assignee: Lucas Public Limited Company, Birmingham, England

[21] Appl. No.: 138,929

[22] Filed: Dec. 29, 1987

[30] Foreign Application Priority Data

Jan. 3, 1987 [GB] United Kingdom ............... 8700040
Aug. 12, 1987 [GB] United Kingdom ............... 8719111

[51] Int. Cl.[4] ............................................. F15B 15/26
[52] U.S. Cl. ............................................. 92/23; 92/24; 92/27; 92/28; 411/521; 188/361; 188/364; 192/85 CA
[58] Field of Search .................. 92/15, 17, 23, 24, 26, 92/27, 28, 30, 60.5; 60/533; 411/517, 520, 521, 910; 403/154, 155, 326; 188/361-370; 192/85 CP, 85 CA

[56] References Cited

U.S. PATENT DOCUMENTS

| | | | |
|---|---|---|---|
| 2,685,275 | 8/1954 | Caldwell | 92/26 |
| 2,708,994 | 5/1955 | Kraft | 188/367 |
| 2,766,473 | 10/1956 | Thackara | 403/326 |
| 2,790,597 | 4/1957 | Turpin | 92/15 |
| 2,851,995 | 9/1958 | Westcott Jr. | 92/26 |
| 2,880,641 | 4/1959 | Sislik | 411/521 |
| 2,904,825 | 9/1959 | Kessler et al. | 411/521 |
| 3,138,929 | 6/1964 | Schatz | 92/6 R |
| 3,429,410 | 2/1969 | Mansen | 192/85 CA |
| 3,777,859 | 11/1973 | Hughes | 92/15 |
| 3,983,969 | 10/1976 | Colpaert et al. | 188/72.4 |
| 4,086,996 | 5/1978 | Gatewood | 192/111 A |
| 4,263,840 | 4/1981 | Herrera | 92/63 |
| 4,391,544 | 7/1983 | Cadwallader | 403/155 |
| 4,454,632 | 6/1984 | Nix et al. | 92/15 |
| 4,480,368 | 11/1984 | Vachon | 92/128 |
| 4,480,530 | 11/1984 | Holmes | 92/78 |
| 4,509,764 | 4/1985 | Brandenstein et al. | 92/15 |
| 4,531,452 | 7/1985 | Spielmann et al. | 403/326 |
| 4,551,976 | 11/1985 | Nix et al. | 92/23 |
| 4,557,361 | 12/1985 | Nix et al. | 92/23 |
| 4,581,979 | 4/1986 | Compton et al. | 192/85 CA |
| 4,585,109 | 4/1986 | Shirley et al. | 192/85 CA |
| 4,607,670 | 8/1986 | Compton et al. | 92/15 |
| 4,609,087 | 9/1986 | Shirley | 192/85 CA |
| 4,629,167 | 12/1986 | Kimura et al. | 92/26 |
| 4,665,802 | 5/1987 | Barker et al. | 92/23 |
| 4,756,159 | 7/1988 | Compton et al. | 188/352 |

FOREIGN PATENT DOCUMENTS

| | | | |
|---|---|---|---|
| 657010 | 2/1938 | Fed. Rep. of Germany | 403/155 |
| 941448 | 1/1959 | Fed. Rep. of Germany | 60/533 |
| 2727835 | 12/1977 | Fed. Rep. of Germany | 403/326 |
| 2837676 | 4/1979 | Fed. Rep. of Germany | 92/15 |
| 2921352 | 12/1979 | Fed. Rep. of Germany | 403/326 |
| 1052744 | 11/1983 | U.S.S.R. | 92/15 |
| 1440848 | 6/1976 | United Kingdom | 92/15 |
| 2138536 | 10/1984 | United Kingdom | 92/15 |

Primary Examiner—Robert E. Garrett
Assistant Examiner—Thomas Denion
Attorney, Agent, or Firm—Harness, Dickey & Pierce

[57] ABSTRACT

A piston and cylinder assembly for a vehicle hydraulic system has a retaining device comprising an insert acting between a piston and the cylinder bore in which it works, the insert having a releasable frictional engagement in the bore and acting as an abutment to hold the piston in its retracted position to maintain the effective length of the assembly at a predetermined value for installation, until the assembly is operated hydraulically. The assembly may be an actuator for a self-energizing disc brake, or a slave cylinder for a vehicle clutch system.

12 Claims, 1 Drawing Sheet

HYDRAULIC PISTON AND CYLINDER ASSEMBLIES

This invention relates to piston and cylinder assemblies for vehicle hydraulic systems.

In such assemblies, once the various components are put together, it is necessary to maintain the effective length of the assembly to ease further installation in the system. For example, self-energising disc brakes, such as are commonly used in tractors, are operated by a double-ended piston and cylinder assembly, the pistons of which are urged apart by a spring. In a free state the spring tends to expand the assembly, making installation in the brake difficult. One solution to this problem is shown in EP-A-203 729, in which such an assembly includes a hold-back device coupling the pistons together at their inner ends, and having a releasable frictional engagement with one piston. The strength of the frictional engagement is chosen to contain the net effect of the spring force until a low hydraulic pressure is introduced into the assembly. However, the inclusion of such a hold-back device tends to complicate the assembly. A similar problem arises in an hydraulic clutch system, in which the master and slave cylinders, and the connections between them, form a sub-assembly which is filled with hydraulic fluid and bled before being installed in the vehicle. Here it is necessary to ensure that the slave cylinder piston is maintained in its retracted position during transportation and installation of the sub-assembly. U.S. Pat. No. 4,454,632 shows a disposable shipping and installation strap which performs this function. The strap has a retaining member, fitted over the end of the output member (on which the piston acts), with two or more strips integrally formed with the retaining member, and attached at their free ends to the exterior of the cylinder housing. Each strip has a reduced strength portion which breaks on first hydraulic operation of the actuator to free the output member. Again, the use of such a strap tends to complicate the assembly, and the broken strips may fall off, which is undesirable.

According to the present invention, a piston and cylinder assembly for a vehicle hydraulic system comprises a cylinder body having a bore and piston means working in the bore, and retaining means to hold the piston means in its retracted position, whereby to maintain the effective length of the assembly at a predetermined value for installation, until the assembly is operated hydraulically, and the retaining means comprises an insert acting between the piston means and the bore, the insert having a releasable frictional engagement in the bore, and acting as an abutment to hold the piston means in its retracted position.

The insert provides a simple way of maintaining the effective length of the assembly during installation without complicating the assembly. It is released when the assembly is first operated hydraulically, being urged out of engagement with the bore by movement of the piston means.

When the insert is released from the bore it does not re-enter the bore. Preferably, it is held captive on the piston means, so there are no loose parts to fall off.

When the insert is in position in the assembly, low pressure bleeding of the assembly can be performed without releasing the piston means. This minimises the volume to be bled. The insert also acts as a dirt shield for the assembly, and as a visual indicator of whether or not the assembly has been actuated hydraulically.

Preferably, the insert comprises a resilient clip, having an abutment plate with a central opening to receive a reduced diameter portion of the piston means, and a flange extending axially from the outer peripheral edge of the plate for frictional engagement in the bore.

The insert may comprise a light metal pressing or a one-piece moulding of plastics material.

In one construction where the piston and cylinder assembly is an actuator for a self-energising disc brake, it comprises a cylinder body having a longitudinal through-bore in which works a pair of opposed brake actuating pistons, and an insert acts between each piston and portions of the bore at opposite ends of the cylinder body.

In another construction, where the assembly is a slave cylinder for a vehicle clutch system it comprises a cylinder body with a bore in which works a slave piston operating an output rod for connection to the clutch operating mechanism, and an insert acts between the piston and a portion of the bore. Preferably, the central opening in the insert receives the output rod, which holds the insert when it is released from the bore.

Figure 2:
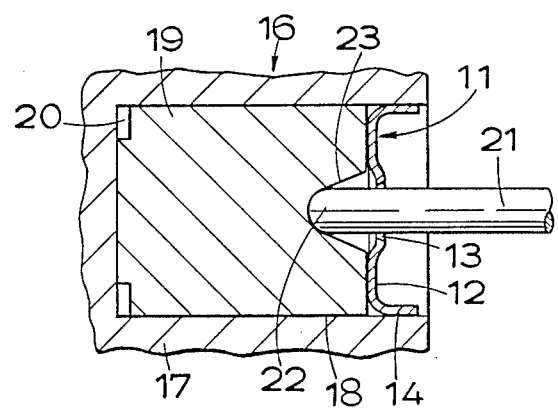

Some embodiments of our invention are illustrated in the accompanying drawings of which:

FIG. 1 shows a longitudinal section through an hydraulic actuator for a self-energising disc brake; and FIG. 2 shows a longitudinal section through a slave cylinder for a vehicle clutch system.

The piston and cylinder assembly 1 of FIG. 1 is adapted for incorporation in a disc brake of the self-energising kind. Such a brake (not shown) comprises a pair of rotatable friction discs provided on opposite sides with linings of friction material which are adapted to be brought into engagement with spaced opposed radial surfaces in a housing by pressure plates located between the discs and centred by three angularly spaced stationary pilots and urged towards each other by tension return springs coupled to the plates at opposite ends. Balls or rollers are located in co-operating oppositely inclined recesses in the opposite faces of the pressure plates which are adjacent in the brake.

The application of the brake is initiated by moving the pressure plates angularly in opposite directions which causes the pressure plates to move axially relatively away from each other due to the tendency for the balls or rollers to ride up ramps defined by the end faces of the recesses. This urges the friction discs into engagement with the faces in the housing. The pressure plates are then carried round with the discs until one is arrested by the engagement of a lug on a respective plate with a drag-taking abutment, whereafter continued angular movement of the other plate provides a servo action.

The brake is applied mechanically for parking or in an emergency by a pull-rod (not shown) which extends through a radial opening in the housing and is coupled to the outer ends of a pair of toggle links of which the inner ends are pivotally connected to respective pressure plates.

For normal service braking the brake is applied hydraulically by the hydraulic actuator 1 which acts between lugs on the respective pressure plates. The lugs are displaced angularly from the toggle links.

The hydraulic actuator 1 comprises a cylinder 2 which is carried from the housing of the brake and has a longitudinally extending open-ended bore 3 in which work a pair of opposed pistons 4, 5 each provided with a seal 6 adjacent to its inner end. Each piston has at its outer end a projection 7 of reduced diameter. A compression spring 8 received at one end in a recess 9 in the inner end of the piston 4 and in abutment with the inner end of the piston 5, acts to urge the pistons 4, 5 relatively away from each other. The spring 8 is located by means of a projection 10 on the piston 5, and the projection 10 is telescopically received within the recess 9. The spring 8 enables the pistons 4, 5 to follow up relative displacements of the pressure plates caused by adjustment for wear of the friction linings, as well as overcoming seal friction and eliminating the effect of a vibrational piston "knock-back". The spring is chosen so that it is easily overpowered by the return springs, but has enough force to respond quickly to a sudden reduction in its working length.

Piston retaining means in the form of inserts 11 are incorporated in the actuator 1 for each piston. As illustrated each insert 11 comprises a clip suitably in the form of a light metal pressing. Each pressing comprises a circular abutment plate 12 against which the outer end of the respective piston abuts, and the plate has a central aperture 13 through which the projection 7 on the respective piston extends, and an annular flange 14 which extends axially from the peripheral edge of the plate 12 in a direction away from the respective piston.

In an operative position for transit and installation, the flanges 14 engage frictionally, suitably with interference, with the portions of the bore 3 at the outer ends of the cylinder 2 to hold the pistons 4, 5 in retracted positions in the bore 3 in which the spring 8 is compressed and the projection 10 is received in the recess 9. In this position the inserts 11 act as dirt shields to prevent the ingress of dirt into the ends of the cylinder bore 7.

After the actuator 1 has been installed in the brake with the pistons 4 and 5 held in their retracted positions by the inserts 11, the system can be bled at low pressure without release of the pistons. This therefore minimises the volume to be bled.

When the application of the brake is initiated by the application of hydraulic pressure to a space 15 in the bore 3 between the pistons 4 and 5, both pistons 4 and 5 move relatively away from each other and the two inserts 11 are urged out of the bore 3, as shown at the right hand end of the drawing.

The two inserts 11 are then held in loose captivity on the extensions 7 and they will not re-enter the bore 3 once they have been released from it.

The piston and cylinder assembly 16 of FIG. 2 is a slave cylinder for a vehicle clutch system. The slave cylinder comprises a cylinder body 17, with a single-ended bore 18 in which works the slave piston 19. The piston 19 is actuated by pressurisation of a pressure space 20 in response to operation of a clutch master cylinder (not shown) by a pedal. The piston 19 operates an output rod 21, having a hemispherical end 22 received in a recess 23 in the forward end of the piston 19. The other end of the rod 21 is adapted to operate a clutch release mechanism (not shown).

The assembly 16 incorporates piston retaining means in the form of an insert 11 similar to that shown in FIG. 1. It will be noted that the rod 21, rather than a projection on the piston, extends through the central aperture 13 of the insert 11.

With the insert 11 in place, the flange 14 engages frictionally with the bore 18 to hold the piston 19 and the rod 21 in their retracted positions. The master cylinder can then be connected to the slave cylinder, filled with hydraulic fluid and bled at low pressure to form a sub-assembly which can be transported and installed in a vehicle, all without releasing the piston 19.

When the clutch system is operated, application of hydraulic pressure to the space 20 moves the piston 19 and rod 21, to urge the insert 11 out of the bore 18. The insert 11 is held in loose captivity on the rod 21, and will not re-enter the bore 18 once released from it.

The insert 11 could be used in other piston and cylinder assemblies as required.

In a modification, the insert 11 may comprise a one-piece plastics moulding.

We claim:

1. A piston and cylinder assembly for a vehicle hydraulic system, comprising a cylinder body having a bore, piston means working in said bore and retaining means to hold said piston means in its retracted position to maintain the effective length of said assembly at a predetermined value for installation until said assembly is operated hydraulically, said retaining means comprising an insert acting between said piston means and said bore, said insert having a releasable frictional engagement in said bore and comprising abutment means to hold said piston means in its retracted position.

2. A piston and cylinder assembly as claimed in claim 1, wherein said insert, once released, does not re-enter said bore.

3. A piston and cylinder assembly as claimed in claim 1, wherein said insert, once released, is held captive on said piston means.

4. A piston and cylinder assembly as claimed in claim 1, wherein said piston means has a reduced diameter portion, and said insert comprises a resilient clip having an abutment plate with a central opening to receive said reduced diameter portion of said piston means, and a flange extending axially from the outer peripheral edge of said plate for frictional engagement in said bore.

5. A piston and cylinder assembly as claimed in claim 4, wherein said abutment plate is generally circular.

6. A piston and cylinder assembly as claimed in claim 4, wherein said flange is annular.

7. A piston and cylinder assembly as claimed in claim 1, wherein said insert comprises a light metal pressing.

8. A piston and cylinder assembly as claimed in claim 1, wherein said insert comprises a one-piece moulding of plastics material.

9. An hydraulic actuator for a self-energising disc brake, said actuator comprising a cylinder body, means defining a longitudinal through-bore in said body, first and second opposed brake actuating pistons working in said bore, and retaining means to hold said pistons in their retracted positions to maintain the effective length of said actuator at a predetermined value for installation until said actuator is operated hydraulically, said retaining means comprising first and second inserts, said first insert acting between said first piston and said bore, and said second insert acting between said second piston and said bore, each said insert having a releasable frictional engagement in said bore, and comprising abutment means to hold its piston in a retracted position.

10. An hydraulic actuator as claimed in claim 9, wherein each of said first and second pistons has a reduced diameter portion, and each insert comprises a resilient clip having an abutment plate with a central opening to receive one said reduced diameter portion, and a flange extending axially from the outer peripheral edge of said plate for frictional engagement in said bore.

11. An hydraulic slave cylinder assembly for a vehicle clutch system, comprising a cylinder body, means defining a bore in said body, a slave piston working in said bore, an output rod operated by said slave piston, and retaining means to hold said slave piston in its retracted position to maintain the effective length of said assembly at a predetermined value for installation until said actuator is operated hydraulically, said retaining means comprising an insert acting between said slave piston and said bore, said insert having a releasable frictional engagement in said bore and comprising abutment means to hold said slave piston in its retracted position.

12. An hydraulic slave cylinder assembly as claimed in claim 11, wherein said insert comprises a resilient clip having an abutment plate with a central opening to receive said output rod, and a flange extending axially from the outer peripheral edge of said plate for frictional engagement in said bore.

* * * * *

UNITED STATES PATENT AND TRADEMARK OFFICE
CERTIFICATE OF CORRECTION

PATENT NO.  : 4,809,588
DATED       : March 7, 1989
INVENTOR(S) : Anthony G. Price; Roy Campbell It is certified that error appears in the above-identified patent and that said Letters Patent is hereby corrected as shown below:

ON TITLE PAGE:

Assignee: "Lucas Public Limited Company" should be
--Lucas Industries Public Limited Company--

Signed and Sealed this

Thirteenth Day of August, 1991

Attest:

HARRY F. MANBECK, JR.

*Attesting Officer*   *Commissioner of Patents and Trademarks*